US011251970B2

(12) United States Patent
Buldas et al.

(10) Patent No.: US 11,251,970 B2
(45) Date of Patent: Feb. 15, 2022

(54) COMPOSITE DIGITAL SIGNATURES

(71) Applicant: Cybernetica AS, Tallinn (EE)

(72) Inventors: Ahto Buldas, Tallinn (EE); Peeter Laud, Tallinn (EE); Mart Oruaas, Tallinn (EE); Aivo Kalu, Tallinn (EE)

(73) Assignee: CYBERNETICA AS, Tallinn (EE)

( * ) Notice: Subject to any disclaimer, the term of this patent is extended or adjusted under 35 U.S.C. 154(b) by 211 days.

(21) Appl. No.: 16/342,473

(22) PCT Filed: Oct. 9, 2017

(86) PCT No.: PCT/IB2017/056222
§ 371 (c)(1),
(2) Date: Apr. 16, 2019

(87) PCT Pub. No.: WO2018/073685
PCT Pub. Date: Apr. 26, 2018

(65) Prior Publication Data
US 2020/0044861 A1    Feb. 6, 2020

(30) Foreign Application Priority Data
Oct. 18, 2016 (GB) ........................... 1617620

(51) Int. Cl.
*H04L 9/32* (2006.01)
*H04L 9/08* (2006.01)
(Continued)

(52) U.S. Cl.
CPC ............ *H04L 9/3247* (2013.01); *H04L 9/085* (2013.01); *H04L 9/3033* (2013.01); *H04L 9/3073* (2013.01)

(58) Field of Classification Search
CPC ......... H04L 9/085; H04L 9/3247; H04L 9/30; H04L 9/3033; H04L 9/3073; H04L 9/3255
See application file for complete search history.

(56) References Cited

U.S. PATENT DOCUMENTS 571,282 A * 11/1896 Pell ........................ F22D 1/02
122/444
2,639,997 A *  5/1953 Drake .................... C03C 17/10
427/230
(Continued)

FOREIGN PATENT DOCUMENTS

JP     2006-333520     12/2006
JP     2010-239662     10/2010

OTHER PUBLICATIONS

Buldas, et al., "Server-Supported RSA Signatures for Mobile Devices," Network and Parallel Computing, Springer International Publishing, pp. 315-333, Aug. 12, 2017.
(Continued)

*Primary Examiner* — Gary S Gracia
(74) *Attorney, Agent, or Firm* — Hamilton, Brook, Smith & Reynolds, P.C.

(57) ABSTRACT

Disclosed herein is a method for generating a composite cryptographic signature. The method comprises receiving a message and a first part of a first party signature, wherein the first part of the first party signature is derived from the message and a first share of a first private key. The method further comprises generating a first party signature from the first part of the first party signature and a second share of the first private key and generating a second party signature from the message and a second private key. The method further comprises combining the first party signature and the second party signature to generate a composite cryptographic signature. An apparatus, a computer-readable medium for implementing this method are also disclosed.

17 Claims, 7 Drawing Sheets

(51) Int. Cl.
*H04L 9/30* (2006.01)
*H04L 29/06* (2006.01)

(56) References Cited

U.S. PATENT DOCUMENTS

| | | | | |
|---|---|---|---|---|
| 5,838,792 A * | 11/1998 | Ganesan | H04L 9/0894 | 380/282 |
| 5,870,723 A * | 2/1999 | Pare, Jr. | G06Q 20/18 | 705/39 |
| 6,119,096 A * | 9/2000 | Mann | G07C 9/37 | 705/5 |
| 6,209,091 B1 * | 3/2001 | Sudia | G06F 21/40 | 705/76 |
| 6,311,272 B1 * | 10/2001 | Gressel | G06K 9/00885 | 713/186 |
| 6,694,025 B1 * | 2/2004 | Epstein | H04L 9/0894 | 380/279 |
| 6,758,394 B2 * | 7/2004 | Maskatiya | G06Q 20/40 | 235/379 |
| 6,823,359 B1 * | 11/2004 | Heidingsfeld | H04L 29/06 | 709/203 |
| 6,934,858 B2 * | 8/2005 | Woodhill | G06F 21/313 | 726/5 |
| 6,956,950 B2 * | 10/2005 | Kausik | G06F 21/6245 | 380/277 |
| 6,996,716 B1 * | 2/2006 | Hsu | H04L 63/08 | 370/352 |
| 7,000,247 B2 * | 2/2006 | Banzhof | G06F 21/577 | 726/2 |
| 7,093,133 B2 * | 8/2006 | Hopkins | H04L 9/302 | 713/176 |
| 7,096,354 B2 * | 8/2006 | Wheeler | G06Q 20/4014 | 705/64 |
| 7,107,246 B2 * | 9/2006 | Wang | G06F 21/35 | 380/282 |
| 7,146,009 B2 * | 12/2006 | Andivahis | H04L 63/06 | 380/277 |
| 7,172,115 B2 * | 2/2007 | Lauden | G07C 9/257 | 235/380 |
| 7,331,518 B2 * | 2/2008 | Rable | G06Q 20/10 | 235/380 |
| 7,334,255 B2 * | 2/2008 | Lin | H04L 63/0428 | 713/168 |
| 7,340,600 B1 * | 3/2008 | Corella | H04L 63/0823 | 713/155 |
| 7,386,720 B2 * | 6/2008 | Sandhu | H04L 9/3271 | 380/277 |
| 7,447,784 B2 * | 11/2008 | Eun | G06Q 30/0601 | 709/220 |
| 7,463,637 B2 * | 12/2008 | Bou-Diab | H04L 63/08 | 370/352 |
| 7,496,662 B1 * | 2/2009 | Roesch | H04L 63/1433 | 709/223 |
| 7,522,723 B1 * | 4/2009 | Shaik | H04L 9/302 | 380/282 |
| 7,526,792 B2 * | 4/2009 | Ross | H04L 63/0263 | 713/154 |
| 7,562,382 B2 * | 7/2009 | Hinton | H04L 63/0815 | 709/225 |
| 7,562,385 B2 * | 7/2009 | Thione | G06F 21/32 | 726/9 |
| 7,571,471 B2 * | 8/2009 | Sandhu | H04L 9/0825 | 726/17 |
| 7,574,733 B2 * | 8/2009 | Woodhill | G06F 21/313 | 705/75 |
| 7,599,493 B2 * | 10/2009 | Sandhu | H04L 9/3271 | 380/277 |
| 7,630,493 B2 * | 12/2009 | Sandhu | H04L 63/0442 | 380/279 |
| 7,711,122 B2 * | 5/2010 | Allen | H04L 9/0825 | 380/286 |
| 7,716,240 B2 * | 5/2010 | Lim | H04L 41/0893 | 707/781 |
| 7,764,970 B2 * | 7/2010 | Neil | G06Q 10/107 | 455/466 |
| 7,793,110 B2 * | 9/2010 | Durfee | G06F 21/577 | 713/187 |
| 7,836,501 B2 * | 11/2010 | Sobel | H04L 63/1441 | 726/22 |
| 7,953,979 B2 * | 5/2011 | Borneman | G06F 21/41 | 713/175 |
| 7,958,362 B2 * | 6/2011 | Hwang | H04L 9/3271 | 713/176 |
| 7,961,645 B2 * | 6/2011 | Gudipudi | H04L 41/12 | 370/254 |
| 7,982,595 B2 * | 7/2011 | Hanna | H04L 63/20 | 340/506 |
| 7,983,987 B2 * | 7/2011 | Kranzley | G06Q 20/02 | 705/44 |
| 8,010,779 B2 * | 8/2011 | Sermersheim | G06F 21/6227 | 713/150 |
| 8,028,329 B2 * | 9/2011 | Whitcomb | H04L 63/0407 | 726/5 |
| 8,099,368 B2 * | 1/2012 | Coulter | G06Q 20/02 | 705/67 |
| 8,136,148 B1 * | 3/2012 | Chayanam | G06F 21/31 | 726/5 |
| 8,141,146 B2 * | 3/2012 | Ozeki | G06F 21/36 | 726/21 |
| 8,151,333 B2 * | 4/2012 | Zhu | H04L 63/0815 | 726/8 |
| 8,161,527 B2 * | 4/2012 | Curren | G06F 21/6227 | 726/2 |
| 8,185,744 B2 * | 5/2012 | Brown | H04L 9/3252 | 713/180 |
| 8,200,980 B1 * | 6/2012 | Robinson | H04L 63/10 | 713/186 |
| 8,225,392 B2 * | 7/2012 | Dubrovsky | H04L 63/1433 | 726/22 |
| 8,245,044 B2 * | 8/2012 | Kang | G06Q 20/42 | 713/176 |
| 8,259,947 B2 * | 9/2012 | Rose | H04L 9/0891 | 380/277 |
| 8,332,627 B1 * | 12/2012 | Matthews | H04L 63/0869 | 713/155 |
| 8,335,933 B2 * | 12/2012 | Humphrey | H04N 21/2347 | 713/193 |
| 8,340,287 B2 * | 12/2012 | Sandhu | H04L 9/3271 | 380/44 |
| 8,340,635 B2 * | 12/2012 | Herz | H04W 4/50 | 455/411 |
| 8,380,192 B2 * | 2/2013 | Kim | H04W 8/22 | 455/435.1 |
| 8,381,297 B2 * | 2/2013 | Touboul | H04L 63/1441 | 726/24 |
| 8,397,301 B2 * | 3/2013 | Hering | G06F 21/577 | 726/25 |
| 8,402,526 B2 * | 3/2013 | Ahn | H04L 67/42 | 726/9 |
| 8,418,168 B2 * | 4/2013 | Tyhurst | G06F 8/65 | 717/173 |
| 8,458,798 B2 * | 6/2013 | Williams | G06F 21/577 | 726/25 |
| 8,484,708 B2 * | 7/2013 | Chern | H04L 67/02 | 726/7 |
| 8,495,720 B2 * | 7/2013 | Counterman | H04L 9/3226 | 726/8 |
| 8,499,149 B2 * | 7/2013 | Chen | H04L 9/3247 | 713/158 |
| 8,499,339 B2 * | 7/2013 | Chao | H04L 63/12 | 726/5 |
| 8,510,820 B2 * | 8/2013 | Oberheide | H04L 63/0272 | 726/9 |
| 8,522,010 B2 * | 8/2013 | Ozzie | H04L 63/18 | 713/155 |
| 8,528,039 B2 * | 9/2013 | Chakarapani | H04N 17/004 | 725/144 |
| 8,533,841 B2 * | 9/2013 | Kulkarni | G06F 21/552 | 726/25 |

(56) References Cited

U.S. PATENT DOCUMENTS

| | | | | |
|---|---|---|---|---|
| 8,538,028 | B2* | 9/2013 | Yeap | H04L 63/0823 380/278 |
| 8,539,544 | B2* | 9/2013 | Garimella | H04L 67/12 726/1 |
| 8,539,567 | B1* | 9/2013 | Logue | H04L 63/0815 726/7 |
| 8,548,426 | B2* | 10/2013 | Smith | G06Q 20/322 455/406 |
| 8,571,220 | B2* | 10/2013 | Ollikainen | H04L 9/0894 380/262 |
| 8,578,162 | B2* | 11/2013 | Jentzsch | G06F 7/582 713/168 |
| 8,595,822 | B2* | 11/2013 | Schrecker | H04L 63/1433 726/14 |
| 8,601,554 | B2* | 12/2013 | Gordon | H04L 63/08 726/5 |
| 8,612,305 | B2* | 12/2013 | Dominguez | G06Q 20/409 705/26.35 |
| 8,627,438 | B1* | 1/2014 | Bhimanaik | G06F 21/36 726/9 |
| 8,646,060 | B1* | 2/2014 | Ben Ayed | H04L 63/205 726/9 |
| 8,646,086 | B2* | 2/2014 | Chakra | H04L 63/1433 726/25 |
| 8,667,288 | B2* | 3/2014 | Yavuz | H04L 9/3247 713/176 |
| 8,689,287 | B2* | 4/2014 | Bohmer | H04L 9/3234 726/2 |
| 8,700,729 | B2* | 4/2014 | Dua | G06Q 20/3674 709/217 |
| 8,713,329 | B2* | 4/2014 | Schneider | H04L 9/085 713/193 |
| 8,713,639 | B2* | 4/2014 | Cheeniyil | H04L 63/20 726/3 |
| 8,719,930 | B2* | 5/2014 | Lapsley | H04L 63/1441 726/22 |
| 8,732,475 | B2* | 5/2014 | Fahrny | H04L 63/08 713/176 |
| 8,732,839 | B2* | 5/2014 | Hohl | G06F 21/577 726/25 |
| 8,737,623 | B2* | 5/2014 | Hart | G06Q 20/3829 380/279 |
| 8,745,703 | B2* | 6/2014 | Lambert | G06F 21/56 726/5 |
| 8,751,801 | B2* | 6/2014 | Harris | G06F 21/31 713/168 |
| 8,756,567 | B2* | 6/2014 | Jentsch | G06F 8/71 717/122 |
| 8,756,651 | B2* | 6/2014 | Baer | H04L 63/20 726/1 |
| 8,756,698 | B2* | 6/2014 | Sidagni | G06F 21/577 726/25 |
| 8,763,077 | B2* | 6/2014 | Oberheide | G06F 21/45 726/1 |
| 8,806,609 | B2* | 8/2014 | Gladstone | H04L 9/0897 726/15 |
| 8,850,516 | B1* | 9/2014 | Hrebicek | G06F 16/1734 726/1 |
| 8,862,097 | B2* | 10/2014 | Brand | G06Q 20/42 455/411 |
| 8,891,772 | B2* | 11/2014 | D'Souza | H04L 63/0428 380/278 |
| 8,893,230 | B2* | 11/2014 | Oberheide | H04L 63/0884 726/2 |
| 8,898,762 | B2* | 11/2014 | Kang | G06Q 20/12 726/7 |
| 8,909,926 | B2* | 12/2014 | Brandt | G06N 20/00 713/166 |
| 8,949,596 | B2* | 2/2015 | Yin | H04L 63/108 713/155 |
| 8,949,927 | B2* | 2/2015 | Arnott | H04L 63/20 726/1 |
| 8,966,587 | B2* | 2/2015 | Nair | H04L 63/0815 726/4 |
| 8,984,276 | B2* | 3/2015 | Benson | G06Q 20/38215 713/155 |
| 9,037,127 | B2* | 5/2015 | Raleigh | G06Q 10/06315 455/419 |
| 9,049,011 | B1* | 6/2015 | Agrawal | H04L 9/0825 |
| 9,049,594 | B2* | 6/2015 | Chen | H04L 63/061 |
| 9,071,611 | B2* | 6/2015 | Yadav | H04L 63/102 |
| 9,076,343 | B2* | 7/2015 | Chaar | G09B 7/02 |
| 9,110,754 | B2* | 8/2015 | Poonamalli | G06F 16/951 |
| 9,118,656 | B2* | 8/2015 | Ting | H04L 63/105 |
| 9,122,888 | B2* | 9/2015 | Devi | G06F 21/606 |
| 9,124,582 | B2* | 9/2015 | Kalinichenko | H04L 63/18 |
| 9,135,458 | B1* | 9/2015 | Hankins, Jr. | H04L 63/0428 |
| 9,154,387 | B2* | 10/2015 | Maki | H04L 43/04 |
| 9,189,491 | B2* | 11/2015 | Fushman | G06F 16/13 |
| 9,201,644 | B2* | 12/2015 | Klein | G06F 8/65 |
| 9,203,841 | B2* | 12/2015 | Neuman | H04L 67/02 |
| 9,223,961 | B1* | 12/2015 | Sokolov | G06F 21/51 |
| 9,225,840 | B2* | 12/2015 | Malatack | H04L 65/1059 |
| 9,253,185 | B2* | 2/2016 | Alaranta | G06F 21/51 |
| 9,258,296 | B2* | 2/2016 | Juthani | H04L 63/083 |
| 9,282,085 | B2* | 3/2016 | Oberheide | H04L 63/061 |
| 9,338,156 | B2* | 5/2016 | Oberheide | H04L 63/18 |
| 9,338,163 | B2* | 5/2016 | Wendling | H04L 63/08 |
| 9,386,003 | B2* | 7/2016 | Kumar | G06Q 20/425 |
| 9,391,980 | B1* | 7/2016 | Krahn | G06F 21/57 |
| 9,430,938 | B2* | 8/2016 | Proud | H02J 50/10 |
| 9,443,084 | B2* | 9/2016 | Nice | G06F 21/577 |
| 9,479,509 | B2* | 10/2016 | Zeuthen | G06F 21/629 |
| 9,659,160 | B2* | 5/2017 | Ligatti | G06F 21/35 |
| 9,668,137 | B2* | 5/2017 | Sigurdson | H04W 12/37 |
| 2001/0021253 | A1* | 9/2001 | Furuya | H04L 9/0637 380/259 |
| 2002/0013898 | A1* | 1/2002 | Sudia | G06Q 20/02 713/155 |
| 2002/0136410 | A1* | 9/2002 | Hanna | H04L 9/088 380/277 |
| 2003/0061506 | A1* | 3/2003 | Cooper | H04L 63/0227 726/4 |
| 2003/0115452 | A1* | 6/2003 | Sandhu | H04L 63/0815 713/155 |
| 2004/0139312 | A1* | 7/2004 | Medvinsky | G06F 21/31 713/150 |
| 2006/0031938 | A1* | 2/2006 | Choi | G06F 21/552 726/25 |
| 2006/0059569 | A1* | 3/2006 | Dasgupta | G06F 21/32 726/28 |
| 2006/0184787 | A1* | 8/2006 | Sandhu | H04L 9/3271 713/155 |
| 2007/0250914 | A1* | 10/2007 | Fazal | G06F 21/31 726/5 |
| 2007/0284429 | A1* | 12/2007 | Beeman | G06F 8/61 235/375 |
| 2007/0297607 | A1* | 12/2007 | Ogura | G08B 13/19656 380/239 |
| 2008/0069347 | A1* | 3/2008 | Brown | H04L 9/3252 380/45 |
| 2008/0120411 | A1* | 5/2008 | Eberle | G06Q 50/10 709/225 |
| 2008/0229104 | A1* | 9/2008 | Ju | H04L 9/3247 713/169 |
| 2009/0055906 | A1* | 2/2009 | von Wendorff | G06F 12/1425 726/5 |
| 2009/0271863 | A1* | 10/2009 | Govindavajhala | H04L 63/1433 726/23 |
| 2010/0023781 | A1* | 1/2010 | Nakamoto | H04L 9/08 713/193 |
| 2010/0037055 | A1* | 2/2010 | Fazio | H04L 9/3255 713/171 |
| 2010/0042954 | A1* | 2/2010 | Rosenblatt | G06F 3/0346 715/863 |
| 2010/0180001 | A1* | 7/2010 | Hardt | H04L 12/189 709/207 |

(56) References Cited

U.S. PATENT DOCUMENTS

| | | | | |
|---|---|---|---|---|
| 2010/0180116 A1* | 7/2010 | Coan | ................. | H04L 9/0891 |
| | | | | 713/168 |
| 2010/0274859 A1* | 10/2010 | Bucuk | ................. | H04L 63/0492 |
| | | | | 709/206 |
| 2010/0281336 A1* | 11/2010 | Seurin | ................. | H04L 9/06 |
| | | | | 714/755 |
| 2011/0264917 A1* | 10/2011 | Barthelemy | ................. | H04L 9/321 |
| | | | | 713/176 |
| 2012/0198228 A1* | 8/2012 | Oberheide | ................. | H04L 63/061 |
| | | | | 713/155 |
| 2013/0044882 A1* | 2/2013 | Rich | ................. | H04L 9/0833 |
| | | | | 380/279 |
| 2014/0156473 A1* | 6/2014 | Murphy | ................. | G06Q 30/04 |
| | | | | 705/30 |
| 2014/0201841 A1* | 7/2014 | Deshpande | ................. | G06Q 20/4016 |
| | | | | 726/25 |
| 2016/0134418 A1* | 5/2016 | Liu | ................. | H04L 9/083 |
| | | | | 713/171 |
| 2016/0165491 A1* | 6/2016 | Liu | ................. | H04L 63/0428 |
| | | | | 370/331 |
| 2016/0174112 A1* | 6/2016 | Liu | ................. | H04W 74/0833 |
| | | | | 370/331 |
| 2016/0294562 A1* | 10/2016 | Oberheide | ................. | H04L 9/0863 |
| 2016/0352525 A1* | 12/2016 | Antipa | ................. | H04L 9/0618 |
| 2017/0012948 A1* | 1/2017 | Peeters | ................. | H04L 9/085 |

OTHER PUBLICATIONS

Damgard, et al., "On the Security of Distributed Multiprime RSA," Information Security and Cryptology, Springer International Publishing, vol. 8949, pp. 18-33, Jan. 1, 2015.

Daza, et al., "Trustworthy Privacy-Preserving Car-Generated Announcements in Vehicular Ad Hoc Networks," IEEE Transactions on Vehicular Technology, vol. 58, No. 4, pp. 1876-1886, May 2009.

International Search Report and Written Opinion dated Jan. 12, 2018 for International Application No. PCT/IB2017/05622, entitled "Composite Digital Signatures".

Intellectual Property Office Search Report dated Apr. 13, 2017 for Great Britain Application No. GB1617620.8, entitled "Composite Digital Signatures".

* cited by examiner

COMPOSITE DIGITAL SIGNATURES

This application is the U.S. National Stage of International Application No. PCT/IB2017/056222, filed Oct. 9, 2017, which designates the U.S., published in English, and claims priority under 35 U.S.C. § 119 or 365(c) to Great Britain Application No. 1617620.8, filed Oct. 18, 2016. The entire teachings of the above applications are incorporated herein by reference.

BACKGROUND

A digital signature is a scheme for demonstrating the authenticity of a digital message or document(s). If a recipient is able to confirm that a digital signature appended to a digital message is valid then that recipient can reasonably believe that the message was created by a known sender, that the sender cannot deny having sent the message, and that the message was not altered in transit.

Often digital signatures employ asymmetric cryptography in which a sender's private key is used to generate a digital signature and in which the sender's public key is used by a recipient to verify that the digital signature, and any message to which the digital signature relates, originated with the sender.

In order for digital signature schemes to work, a sender must be able to store one or more private keys securely. A sender may, for example, store the one or more private keys in special hardware, such as a separate memory device or a smart-card. However, in a world in which the use of digital signatures is becoming more prevalent, this proves an expensive and inefficient solution for wide employment of digital signatures. Furthermore, there is a desire to integrate digital signatures with modern technologies such as mobile devices including mobile phones, which a lot of people use for communicating every day. However, mobile devices may not have the capability to physically connect to a card-reader, the connection interfaces often change rapidly, and connecting a card-reader with a mobile phone is inconvenient for a user. Furthermore, the cryptographic algorithms used for digital signatures may become insecure and the key size insufficient. Changing the algorithm or the key size would mostly mean physical replacement of all smart-cards in use.

Software is much easier to update. Mobile devices update their software automatically so that the users often do not even notice the updating process. From an economic perspective, digital signature solutions based solely on software are appealing. The hardest thing to solve in software-based digital signature solutions is private key management. Keys stored in the static memory of a mobile device or any other type of a computer can easily be cloned by attackers who gain access to the memory. With a cloned key, an attacker can create an unlimited amount of forged signatures that are indistinguishable from the genuine signatures used by a genuine sender.

Even if private keys are stored in encrypted form, using passwords as encryption keys, it is possible for attackers to find the right key by using the so-called dictionary attack. With a dictionary attack, an attacker has a dictionary of passwords which they try one by one until the right password is found. For such an attack to succeed, one needs only for there to be a relatively small number of passwords, and a reference point such that the attacker will know when he has been successful. Practice has shown that human-memorisable passwords are too weak to withstand dictionary attacks.

The issues outlined above are at least as pronounced when multi-party protocols are considered. For example, a sender may send a (digitally signed) message to a receiver and receive a response. The response may be, for example, an indication that the digitally signed message has been received and understood by the receiver. The sender may accordingly want to verify that the receiver did indeed receive the original digitally signed message (and not some other message) and that the response did indeed come from the receiver. Alternatively, for commercial reasons or otherwise a sender may wish to send a message to a third party such that the third party can rest assured that the message has been verified by a second party. Accordingly, a secure method for co-signing messages is desired.

SUMMARY

A method is provided for generating a composite cryptographic signature. The method comprises receiving a message and a first part of a first party signature, the first part of the first party signature derived from the message and a first share of a first private key. The method further comprises generating a first party signature from the first part of the first party signature and a second share of the first private key. The method further comprises generating a second party signature from the message and a second private key. The method further comprises combining the first party signature and the second party signature to generate a composite cryptographic signature.

A number of advantages of the present disclosure will be made apparent to the skilled person. For example, in a scenario in which a first party, or client device, holds the first share of the first private key, and a second party, or server, holds the second share of the first private key and the second private key, then neither the first party or second party alone can make a valid composite signature. Furthermore, if the first party, or client device, is compromised then an attacker is unable to apply a dictionary attack without also having to compromise the second party. As will also be described below, it is easy also for the second party to detect when the first party has been compromised.

The first private key and a public key may be a first key pair. The second private key and a public key may be a second key pair. The public key of the first key pair may be the same as the public key of the second key pair.

The first private key may comprise a first private modulus and a first private exponent. The second private key may comprise a second private modulus and a second private exponent. The public key may comprise a public exponent.

The first private modulus may be a product of prime numbers. The second private modulus may be a product of prime numbers. Each of the prime numbers may be coprime to the public exponent.

The method may further comprise generating a composite public modulus from the first private modulus and the second private modulus.

The first share of the first private key may comprise a first additive share of the first private exponent. The second share of the first private key may comprise a second additive share of the first private exponent.

The first share of the first private key may comprise a first multiplicative share of the first private exponent. The second share of the first private key may comprise a second multiplicative share of the first private exponent.

The method may further comprise verifying the origin of the first part of the first party signature using the public key and the message. Receiving a message and a first part of the first party signature may comprise receiving a signing request comprising the message and the first part of the first party signature, and verifying the origin of the first part of the first party signature may comprise checking that the signing request further comprises information relating to one or more previous communications from the same origin.

Receiving a message and a first part of a first party signature may comprise receiving a message and a first part of a first party signature from a client device. Receiving a message and a first part of a first party signature may comprise receiving a message and a first part of a first party signature over a secure channel.

The message may be a hashed message. A hash function is any suitable cryptographic function which can be used to map data of arbitrary size to data of a finite size. The message may be a padded message. The message may be both hashed and padded.

An apparatus is provided. The apparatus comprises at least one processor and at least one memory, wherein the at least one memory stores computer-executable instructions which, when executed by the at least one processor, cause the apparatus to perform a method as disclosed herein.

A computer readable medium is provided. The computer readable medium has computer-executable instructions to cause a computer to perform a method according to any of the methods disclosed herein.

A method for generating a composite cryptographic signature is provided. The method comprises, at a first device, generating a first part of a first party signature from a message and a first share of a first private key. The method further comprises, at the first device, sending the message and the first part of the first party signature to a second device. The method further comprises, at the second device, generating a first party signature from the first part of the first party signature and a second share of the first private key. The method further comprises, at the second device, generating a second party signature from the message and a second private key. The method further comprises, at the second device, combining the first party signature and the second party signature to form a composite cryptographic signature.

The method may further comprise, at the second device, communicating the composite cryptographic signature and a composite public key to the first device. The method may further comprise, at the first device, verifying the composite cryptographic signature using the message and the composite public key.

A system for generating a composite cryptographic signature is provided. The system comprises a first device and a second device. The first device and the second device each comprise a processor and at least one memory. The at least one memory of the first device and the at least one memory of the second device each store computer-executable instructions which, when executed by the processors of the first device and the second device respectively, cause the first device and the second device to perform a method as described herein.

BRIEF DESCRIPTION OF FIGURES

Illustrative embodiments of the present disclosure will now be described, by way of example only, with reference to the drawings. In the drawings.

Throughout the description and the drawings, like reference numerals refer to like parts.

DESCRIPTION

Figure 1:
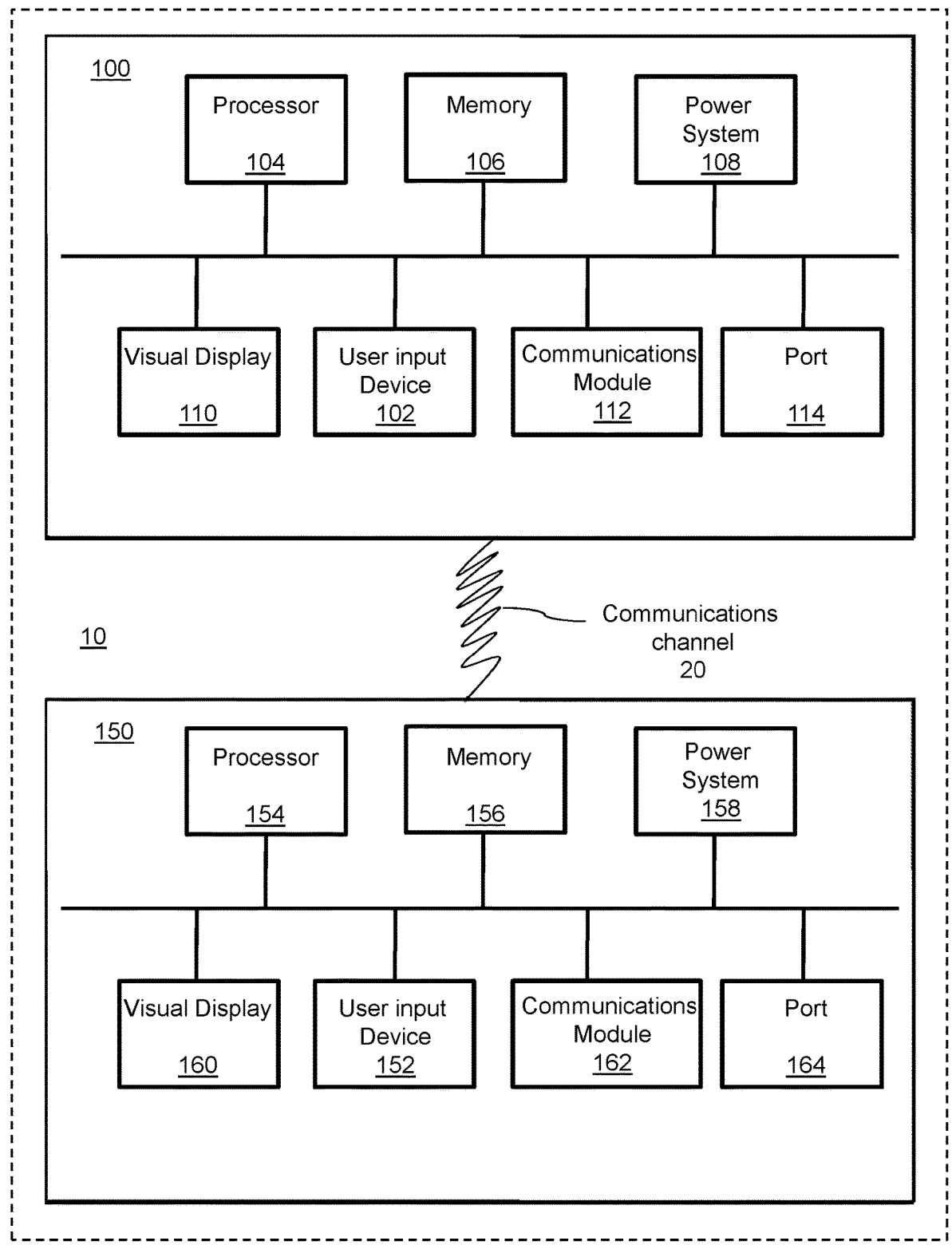
FIG. 1 shows an illustration of a first party, or client device, and a second party, or server.

Whilst various embodiments of the invention are described below, the invention is not limited to these embodiments, and variations of these embodiments may be made without departing from the scope of the invention.

In the below discussion, the terms "client device" and "server" are used. These terms are purely to distinguish between two parties that interact, i.e. the client device is a first party and the server is a second party. The skilled person would therefore understand that the terms "client device" and "server" are not restrictive. Accordingly, the skilled person would appreciate that a "client signature" or "first party signature" is a digital signature of the first party. Similarly, the skilled person would appreciate that a "server signature" or a "second party signature" is a digital signature of the second party.

In the discussion below, the terms "public" and "private" are used. In the context of asymmetric key pairs, the skilled person would understand that the public key and the private key perform inverse operations, and accordingly, an encryption device may use one of the public key or the private key to encrypt data, and a decryption device may use the other of the public key or the private key to decrypt the data. The skilled person would understand that the private key is a key that is not openly communicated to other parties, and the skilled person would also understand that a public key is a key that is not a private key. While a private key is securely stored, a public key may be knowable to third parties, and may sometimes be openly communicated. For example, a public key may be published in a directory or openly broadcast, or may be a key that an adversary may obtain. Similarly, in what follows, a private exponent or private modulus is an exponent or modulus that is intended to be kept secret. Conversely, a public exponent or a public modulus is an exponent or modulus that is not private.

A key may be shared between two or more parties, where each party holds a share. In such a scenario, a key can only be reconstructed when a sufficient number (of possibly different types) of shares are combined together. Accordingly, a single share of a key on its own cannot be used to reconstruct the key unless combined with a sufficient number of further shares. A key may be "additively shared" if one or more components of shares must be added together to reconstruct the key. In some of the examples that follow, two private exponents are added together to reconstruct a private key. A key may be "multiplicatively shared" if one or more components of shares are multiplied together to reconstruct the key. In some of the examples that follow, two private exponents are multiplied together to reconstruct a private key. The skilled person would appreciate that other types of shares exist and are applicable to the following methods.

In the following, a cryptosystem based on modular arithmetic and the factorisation of large numbers is used. That is, the composite signature described below looks like an ordinary RSA (Rivest-Shamir-Adleman) signature and successfully verifies with standard crypto-libraries. However, the skilled person would understand that the methods and techniques taught herein may be used in conjunction with any suitable asymmetric cryptosystem in which public keys and private keys are generated. For example, an asymmetric cryptosystem based on elliptic curves and/or discrete logarithms may be used.

A communication channel is any suitable communication method. A communication channel may be considered secure if an adversary does not have access to data communicated via the communication channel.

FIG. 1 shows the architecture of an example system 10. The system 10 comprises a client device 100 and a server 150. The system 10 further comprises a communication channel 20. The communication channel 20 may be a direct channel or an indirect channel over a communications network. For example, the communication channel 20 may comprise the Internet.

Referring to the figure, the client device 100 includes a number of user interfaces including a visual display 110 and a virtual or dedicated user input device 102. The client device 100 further includes a processor 104, a memory 106 and a power system 108. The client device 100 further comprises a communications module 112 for sending and receiving communications between processor 104 and remote devices such as server 150. For example, the communications module 112 is used for sending and receiving communications across communications channel 20 to a communications module 162 of the server 150. The client device further comprises a port 114 for connecting to further systems, or devices, for example a secondary memory device such as a USB stick.

The processor 104 is configured to receive data, access the memory 106, and to act upon instructions received either from said memory 106, from communications module 112 from user input device 102. The processor 104 is further configured to process instructions pertaining to encryption and decryption. In this respect, the processor 104 is capable of retrieving one or more private keys from memory 106 or from some other source such as via communications module 112 or port 114. The processor is further configured to control the display 110 and to control communications to remote parties such as server 150 via communications module 112. The processor 104 may execute instructions stored in memory 106 in order to encrypt data prior to sending via communications module 112 or in order to decrypt data received from communications module 112.

In operation the processor 104 can execute computer-executable instructions stored in the memory 106 and the results of the processing can be displayed to a user on the display 110. User inputs for controlling the operation of the computer may be received via input device(s) 102.

Server 150 comprises a user inputs device 152 a processor 154, a memory 156, a power system 158, a visual display 160, a communications module 162 and a port 164. The communications module 162 is used by the server to send and receive communications from one or more client devices 100. The processor 154 is configured to receive data, access the memory 156, and to act upon instructions received either from said memory 156, from communications module 162, or from input device 152. The processor 154 is further configured to process instructions pertaining to encryption and decryption. For example, the processor 154 it configured to retrieve public and/or private keys from memory 156.

In operation the processor 154 can execute computer-executable instructions stored in the memory 156 and the results of the processing can be displayed to a user on the display 150. User inputs for controlling the operation of the computer may be received via input device(s) 152.

Other architectures to that shown in FIG. 1 may be used as will be appreciated by the skilled person. The client device, or first device, and the server, or second device, may be, for example, a computer, a mobile phone, a tablet, or other device capable of performing a method according to computer-executable instructions.

A user of the client device 100 may desire to send a message m to the server 150 in such a way that the server 150 is able to verify that the message m originated with the client device 100. However the user of the client device 100 may also desire to receive an acknowledgement that the message m was received by the server and to be secure in the knowledge that the acknowledgement originated with the server 150 and not with an adversarial party. For such a purpose, a composite cryptographic signature may be generated using a method such as that set out below, in which the composite cryptographic signature is generated from a digital signature of the client's device 100 and a digital signature of the server 150. If the client device 100 is able to send message m and information pertaining to its digital signature to server 150, and to receive an acknowledgement, then the client's device 100 may be able to verify that the acknowledgement came from the server 150 and that the acknowledgement was created using both the digital signature of the client device 100 and the digital signature of the server 150.

Figure 2:
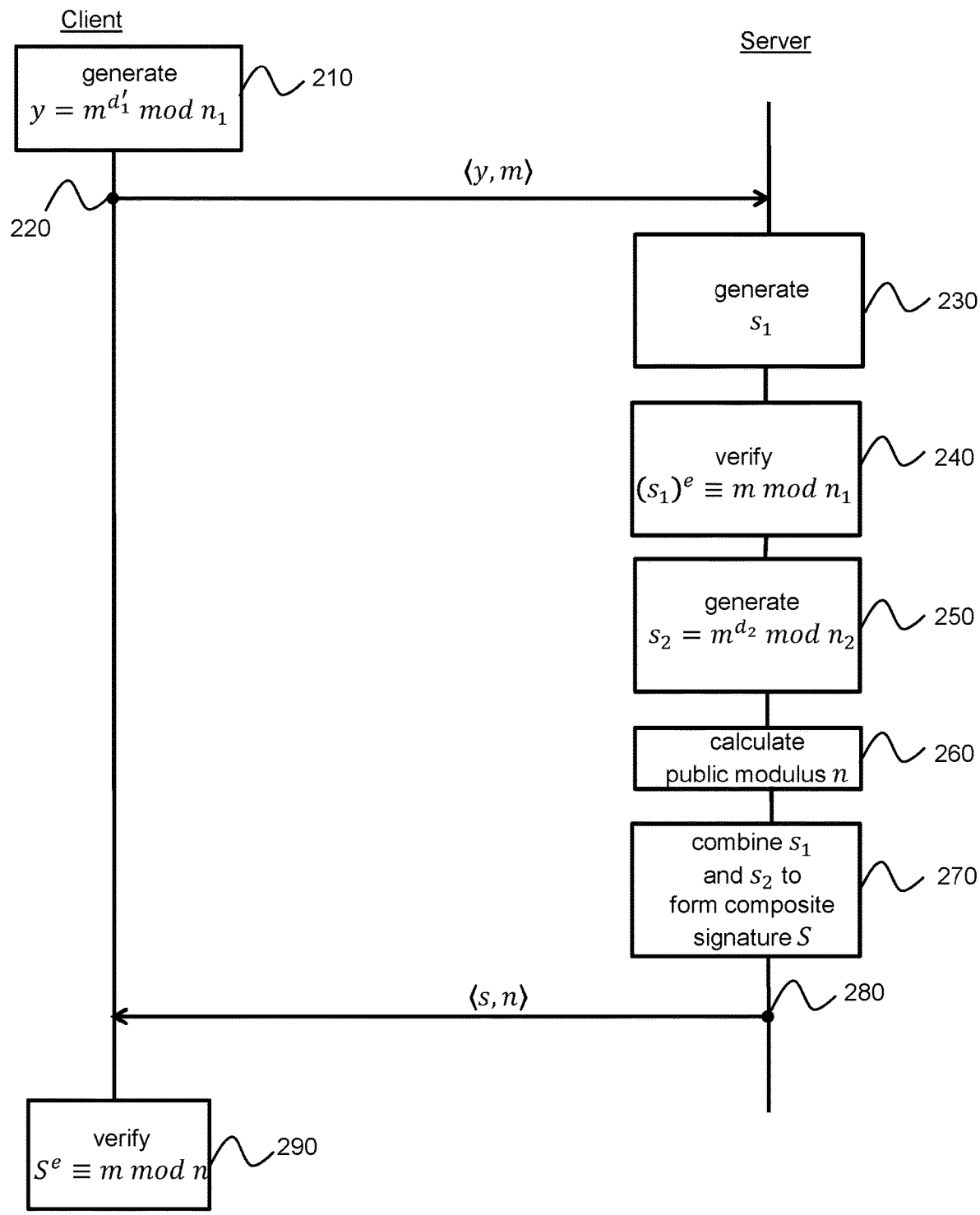
FIG. 2 illustrates a method for generating a composite cryptographic signature.

FIG. 2 shows a method for generating a composite cryptographic signature S. In the figure, time flows from top to bottom. Prior to the method shown in FIG. 2, a client device (which may or may not be client device 100) and a server (which may or may not be server 150) agree on a public exponent e. The public exponent e may be widely broadcast, for example it may be published in a directory open to the public.

Prior to the method shown in FIG. 2, the client device has stored in memory a first share $\langle d_1', n_1 \rangle$ of a first private key $\langle d_1, n_1 \rangle$ (this will be explained further below). The first private key $\langle d_1, n_1 \rangle$ comprises a first private exponent $d_1$ and a first private modulus $n_1$ and is defined such that:

$$ed_1 \equiv 1 \bmod \varphi(n_1)$$

where $\varphi$ is the Euler totient function. The function $\varphi(x)$ counts the positive integers up to a given integer x that are relatively prime to x.

Prior to the method shown in FIG. 2, the server has stored in memory a second share $\langle d_1'', n_1 \rangle$ of the first private key $\langle d_1, n_1 \rangle$. The server also has stored in memory a second private key $\langle d_1, n_1 \rangle$. The second private key comprises a second private exponent $d_2$ and a second modulus $n_2$. The second private key $\langle d_1, n_1 \rangle$ is defined such that:

$$ed_2 \equiv 1 \bmod \varphi(n_2).$$

At step 210, the client device generates a first party of a client signature $s_1$ from the message m and the first share $\langle d_1', n_1 \rangle$ of the first private key $\langle d_1, n_1 \rangle$. In particular, the client device computes:

$$y = m^{d'_1} \bmod n_1.$$

In this example, the first share of the first private key comprises a first private exponent share $d_1'$ and the first private modulus $n_1$. For extra security, the message m may be hashed and/or padded.

At step 220, the client device sends a signing request to the server. The signing request comprises the message m and the first party of the client signature $s_1$. The signing request may be sent directly or indirectly to the server and may be sent over an encrypted channel. For example, message m and the first part y of the client signature $s_1$ may be encrypted using any suitable cryptographic scheme, for decryption at the server.

On receiving the message m and the first part y of the client signature $s_1$ from the client device, the server, at step 230, generates the client signature $s_1$ from the first part y and the second share $\langle d_1'', n_1 \rangle$ of the first private key. The second share of the first private key comprises a second private exponent share $d_1''$ and the first private modulus $n_1$. The operation performed by the server at step 230 depends on how the first share and the second share of the first private key are related.

In one embodiment, the first private key may be additively shared. In this scenario, the first private exponent $d_1$ is related to the first private exponent share $d_1'$ and the second private exponent share $d_1''$ by:

$$d_1 = d_1' + d_1'' \bmod \varphi(n_1).$$

The first private exponent is therefore additively shared between the client device and the server. $d_1'$ is randomly generated and is independent (as a random variable) of $d_1$ and hence there is no way for an adversary who gains access to $d_1'$ (encrypted or not) to successfully find $d_1$ without communication with the server. Similarly, $d_1''$ is randomly generated and is independent (as a random variable) of $d_1$ and hence there is no way for an adversary who gains access to $d_1''$ to successfully find $d_1$ without communication with the client device. If the first private key is additively shared between the client device and the server then, at step 230, the server generates the client signature $s_1$ by computing:

$$s_1 = y \cdot m^{d_1''} \bmod n_1 = m^{d_1'} \cdot m^{d_1''} \bmod n_1 = m^{d_1' + d_1''} \bmod n_1 = m^{d_1' + d_1'' \bmod \varphi(n_1)} \bmod n_1 = m^{d_1} \bmod n_1.$$

In another embodiment, the first private key may be multiplicatively shared. In this scenario, the first private exponent $d_1$ is related to the first private exponent share $d_1'$ and the second private exponent share $d_1''$ by:

$$d_1 = d_1' d_1'' \bmod \varphi(n_1).$$

The first private exponent is therefore multiplicatively shared between the client device and the server. $d_1'$ is randomly generated and is independent (as a random variable) of $d_1$ and hence there is no way for an adversary who gains access to $d_1'$ (encrypted or not) to successfully find $d_1$ without communication with the server. Similarly, $d_1''$ is randomly generated and is independent (as a random variable) of $d_1$ and hence there is no way for an adversary who gains access to $d_1''$ to successfully find $d_1$ without communication with the client device. If the first private key is multiplicatively shared between the client device and the server then, at step 230, the server generates the client signature $s_1$ by computing:

$$s_1 = y^{d_1''} \bmod n_1 = (m^{d_1'})^{d_1''} \bmod n_1 = m^{d_1' d_1''} \bmod n_1 = m^{d_1' d_1'' \bmod \varphi(n_1)} \bmod n_1 = m^{d_1} \bmod n_1.$$

Accordingly, the server uses the first part y of the client signature $s_1$ and the second share $\langle d_1'', n_1 \rangle$ of the first private key to generate the client signature $s_1$. Note that the server therefore does not at any time in the method of FIG. 2 require knowledge of either the first private exponent $d_1$ or the first private exponent share $d_1'$.

At step 240, the server verifies that the first party of the client signature $s_1$ was generated using the first share $\langle d_1', n_1 \rangle$ of a first private key $\langle d_1, n_1 \rangle$. In this way, the server can determine that the message m and the first part y came from the client device. In order to perform the verification the server checks that:

$$(s_1)^e \equiv m \bmod n_1.$$

If the verification step is satisfied then, at step 250, the server generates a server signature $s_2$. The server signature $s_2$ is generated by:

$$s_2 = m^{d_2} \bmod n_2$$

At step 260, the server calculates a public modulus n (so called because it can subsequently be made public). The modulus n is the product of $n_1$ and $n_2$ i.e. $n = n_1 n_2$.

The skilled person would understand that step 260 need not be a part of this method. As the server has knowledge of $n_1$ and $n_2$ before the protocol of FIG. 2 begins, it may be that the modulus n is computed and made public before the protocol of FIG. 2 commences or at any other time.

At step 270, the server combines the client signature $s_1$ and the server signature $s_2$ to form a composite cryptographic signature S. The composite function S is based on the Chinese remainder theorem and is of the form $S = C_{n_1 n_2}(s_1, s_2)$ where $$C_{n_1 n_2}(s_1, s_2) = \alpha n_1 s_2 + \beta n_2 s_1 \bmod n$$

and $\alpha$ and $\beta$ are integers satisfying $\alpha n_1 + \beta n_2 = 1$. Such $\alpha$ and $\beta$ exist, assuming that $n_1$ and $n_2$ are relatively prime.

At step 280, the server communicates the composite signature S and, optionally, the public modulus n to the client device.

At step 290, the client device may verify that the composite signature S has indeed been created using the server's private key. The client device may then determine that the composite signature S did in fact originate with the server and not with an adversarial party. In order to perform this verification, the client device checks that $$S^e \equiv m \bmod n.$$

In the method of FIG. 2, at no point is the first private modulus $n_1$ or the second private modulus $n_2$ made public. Furthermore, if the client device is hacked then the adversary will not be able to create a valid composite signature without the server. If the client device is hacked then it is not also feasible to apply a dictionary attack without communication to the server. Additionally, the server alone cannot create a valid composite digital signature without the client device's share of the first private key.

The skilled person would understand that variations of the protocol described above may be made. For example, the verification steps 240 and 290 may be omitted. The server or receiving party may not verify that the original transmission originated from the client device and may instead process the transmission as if it had come from the client device. Similarly, the client device may not verify that the composite signature has been received from the server. A third party may verify, or no verification at all may occur.

Figure 3:
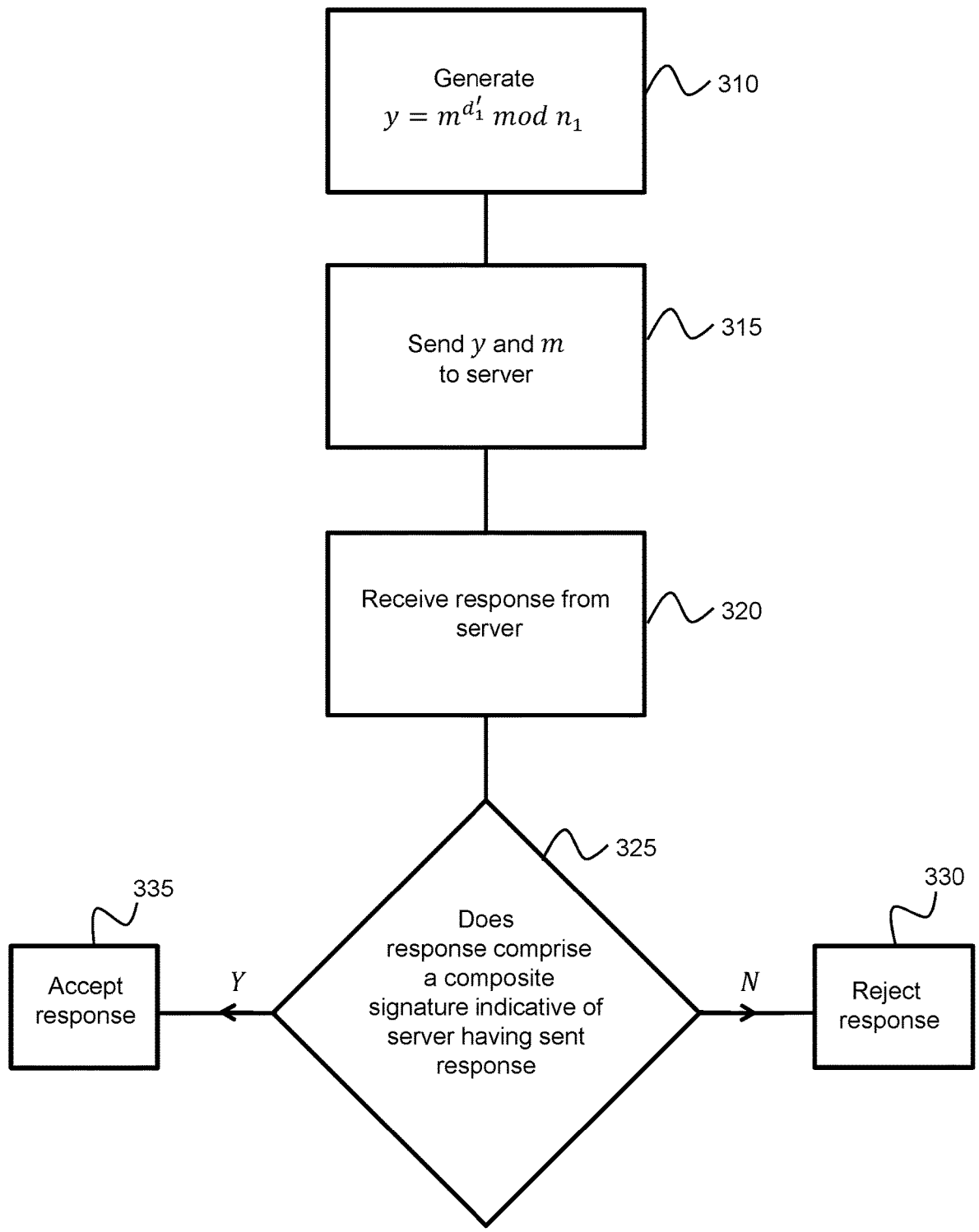
FIG. 3 is a flowchart of a method for generating a composite cryptographic signature.

FIG. 3 is a flowchart of a method that may be carried out by a client device.

At step 310, the client device generates a first part $y = m^{d_1'} \bmod n_1$ of a client signature $s_1$ from the message m and the first share $\langle d_1', n_1 \rangle$ of the first private key $\langle d_1, n_1 \rangle$.

At step 315, the client device sends a signing request to a server. The signing request comprises the message m and the first party of the client signature $s_1$. The message may be sent over a secure communications channel.

At step 320, the client device receives a response z, purported to be from the server.

At step 325, the client device checks whether or not the response comprises a composite signature that would indicate that the response has come from the server. In particular, the client device checks whether or not $z^e \equiv m$ mod n.

If, at step 325, the client device finds that $z^e \not\equiv m$ mod n then a determination can be made that z does not comprise a composite signature that comprises a combination of both a client signature and a server signature. Accordingly, the client device may reject the response z at step 330.

If, at step 325, the client device finds that $z^e \equiv m$ mod n then a determination can be made that z comprises a composite signature that comprises a combination of both a client signature and a server signature. Accordingly, the client device may accept the response z at step 335.

Figure 4:
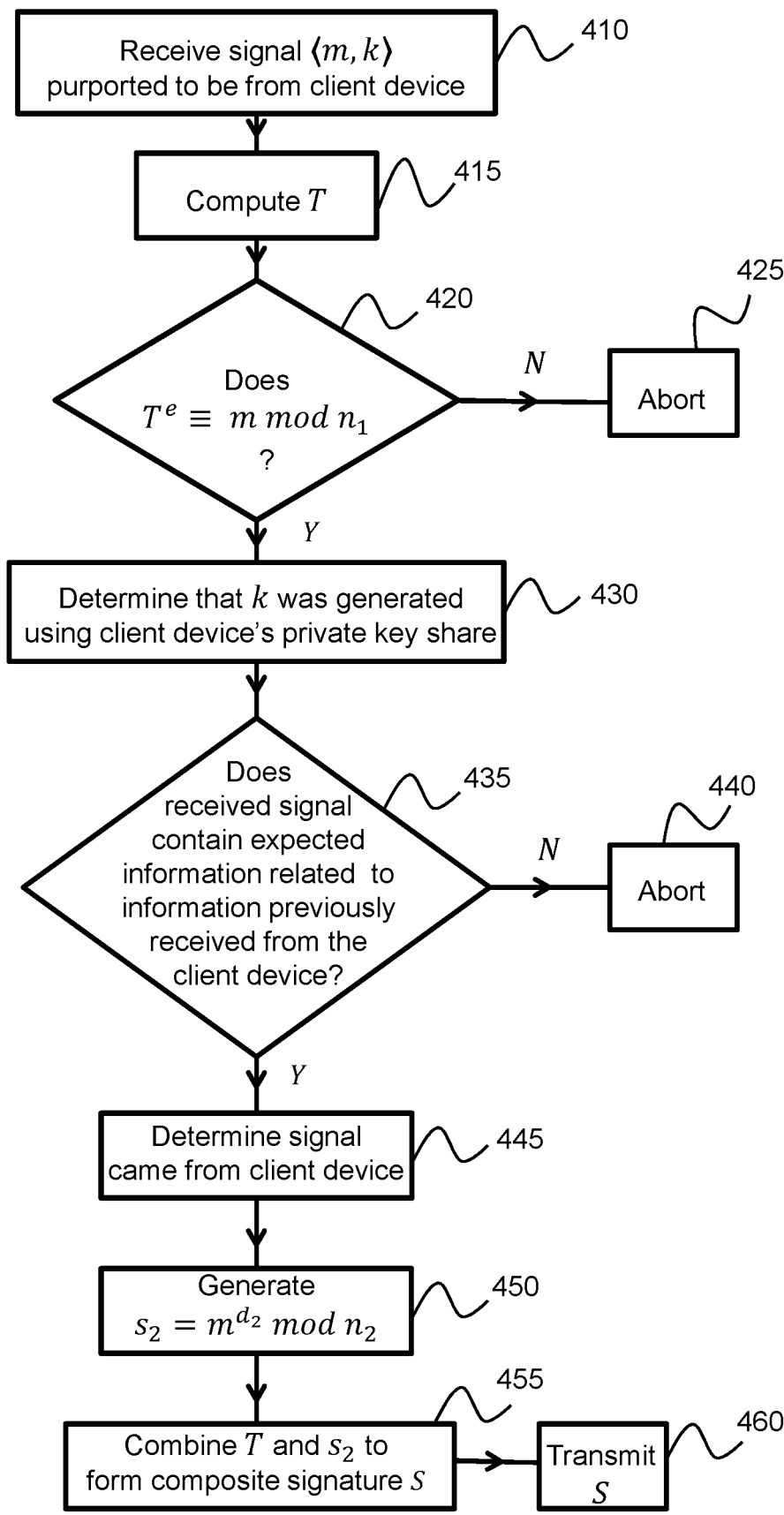
FIG. 4 is a flowchart of a method for generating a composite cryptographic signature.

FIG. 4 is a flowchart of a method for generating a composite cryptographic signature, the method performed by a server. At step 410, the method comprises receiving a signal purported to be from a client device. The signal comprises a message m and a number k, where k is purported to be a first part of a client signature which verifies that the message m was sent from the client device.

At step 415, the server consults a second share $\langle d_1'', n_1 \rangle$ of the first private key, the second share stored in the server's memory. The server computes T, which can be used to check whether or not the message m was sent from the client device. If the first private key was additively shared between the server and the client device then the server computes:

$$T = k \cdot m^{d_1''} \bmod n_1.$$

If instead the first private key was multiplicatively shared between the server and the client device then the server computes:

$$T = k^{d_1''} \bmod n_1.$$

At step 420, the server checks whether or not the received number k was generated using the client device's share of the first private key. That is, the server checks that $T^e \equiv m$ mod $n_1$.

If, at step 420, the server finds that $T^e \not\equiv m$ mod $n_1$ then the method may abort (step 425). For example, the server may cease communication or may send an error message to the sender.

If, however, at step 420 the server finds that $T^e \equiv m$ mod $n_1$ then the server may determine that the received number k was generated using the client device's share of the first private key (step 430).

At step 435 the server may perform a further check of the received signal. In particular, the server may check that the received signal contains information relating to information previously received from the client device. For example, a check may be performed to determine whether the message m contains at least a hash of a message m' known to have been received previously from the client device.

If at step 435 the signal fails the further check then the method may be aborted. The server may make a determination that the client device's private key has been cloned and that an adversary has sent the message m and the number k.

If at step 435 the signal passes the further check, then the server may determine that the message m and the number k did come from the client device (step 445). The method then progresses to step 450.

At step 450, the server computes a server signature $s_2 = m^{d_2}$ mod $n_2$.

At step 455, the server combines the client signature T and the server signature $s_2$ to generate a composite cryptographic signature S. The composite cryptographic signature is given by $S = C_{n_1, n_2}(T, s_2)$.

At step 460, the server transmits the composite signature.

Figure 5:
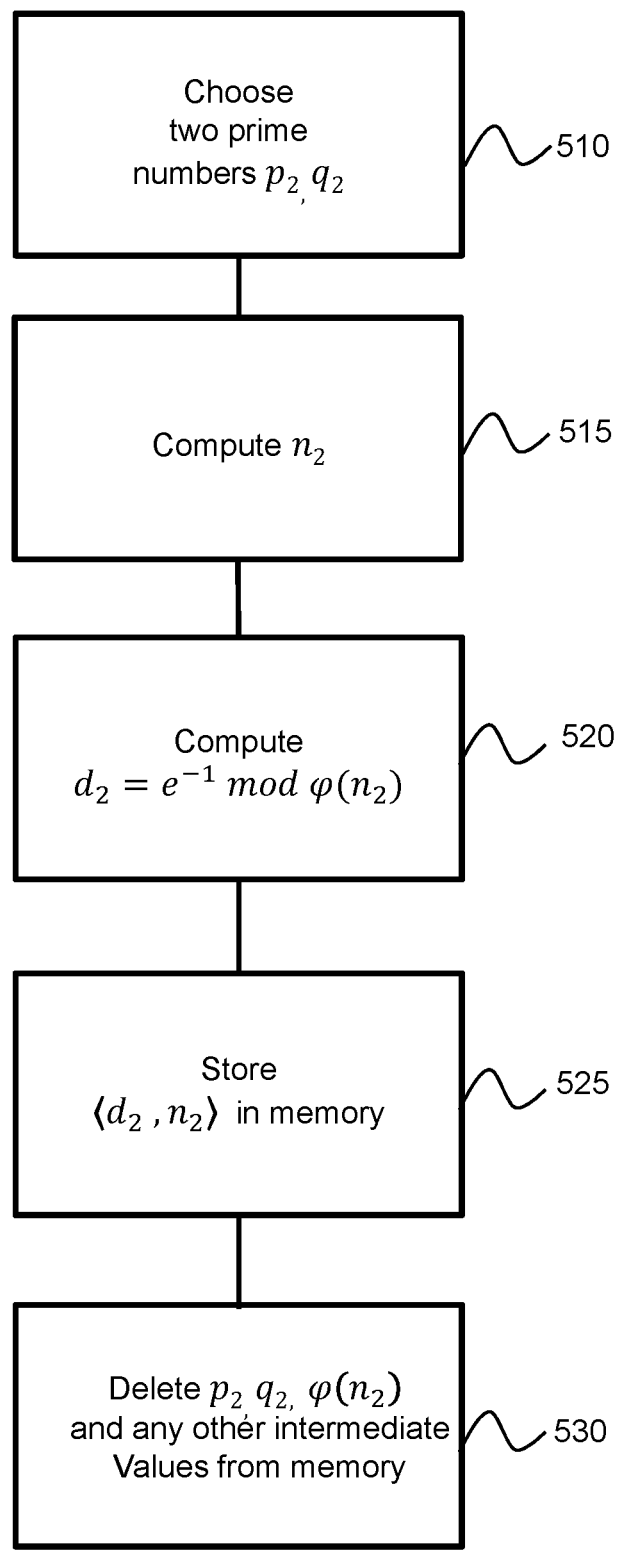
FIG. 5 is a flowchart of a method for initialising a second party or server for generating a composite cryptographic signature.

FIG. 5 is a flowchart of a method for initialising a server for generating a composite cryptographic signature. The method of FIG. 5 may be performed during manufacture to configure a server for generating a composite signature, or may be performed during the signing process.

At step 510, two prime numbers $p_2$ and $q_2$ are chosen at random. A check is performed to determine that the greatest common denominator of each prime minus one and a pre-established public exponent e is equal to 1, i.e. $\gcd(p_2-1, e) = \gcd(q_2+1, e) = 1$. If either of the two selected prime numbers chosen is unsuitable, then the server chooses one or more new prime numbers and performs the check again. When two prime numbers $p_2$ and $q_2$ are chosen which satisfy $\gcd(p_2-1, e) = \gcd(q_2-1, e) = 1$ the method progresses to step 515.

At step 515, the private modulus $n_2$ is calculated as the product of the two chosen primes, $n_2 = p_2 q_2$.

At step 520, the private exponent $d_2$ is calculated as $d_2 = e^{-1}$ mod $\varphi(n_2)$, where $\varphi$ is the Euler totient function.

At step 525, the server stores the private key $\langle d_2, n_2 \rangle$ in memory. At step 530, the server deletes the prime numbers $p_2$ and $q_2$ from memory and also deletes any other intermediate values generated during generation of the server's private key $\langle d_2, n_2 \rangle$.

The security of the methods detailed above is demonstrated in the annexe.

Figure 6:
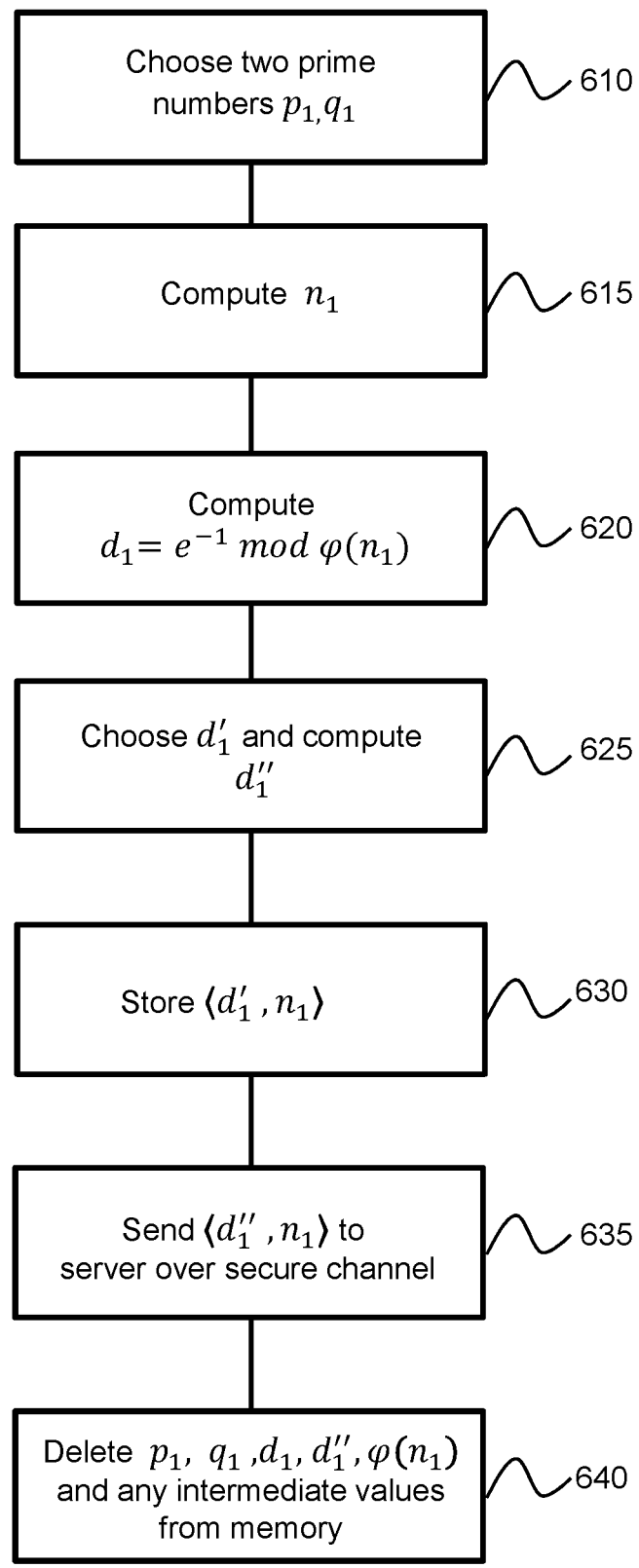
FIG. 6 is a flowchart of a method for initialising a first party or client device for generating a composite cryptographic signature.

FIG. 6 is a flowchart of a method for initialising a client device for generating a composite cryptographic signature.

At step 610, two prime numbers $p_1$ and $q_1$ are chosen at random. A check is performed to determine that the greatest common denominator of each prime minus one and a pre-established public exponent e is equal to 1, i.e. $\gcd(p_1-1, e) = \gcd(q_1-1, e) = 1$. If either of the two selected prime numbers chosen is unsuitable, then the server chooses one or more new prime numbers and performs the check again. When two prime numbers $p_1$ and $q_1$ are chosen which satisfy $\gcd(p_1-1, e) = \gcd(q_1-1, e) = 1$ the method progresses to step 615.

At step 615, the private modulus $n_1$ is calculated as the product of the two chosen primes, $n_1 = p_1 q_1$.

At step 620, the private exponent $d_1$ is calculated as $d_1 = e^{-1}$ mod $\varphi(n_1)$, where $\varphi$ is the Euler totient function.

At step 625, the client device chooses a first private exponent share $d_1'$ and finds the second private exponent share $d_1''$.

If the first private exponent is to be additively shared between the client device and the server then the client device chooses $d_1'$ at random from the interval $[1, \ldots, 2^{len(n_1)}-1]$, with the value $\varphi(n_1)$ excluded. The second private exponent share $d_1''$ is then given by $d_1'' = d_1 - d_1'$ mod $\varphi(n_1)$.

If the first private exponent is to be multiplicatively shared between the client device and the server then the client device chooses $d_1'$ at random from the interval $[1, \ldots, 2^{len(n_1)}-1]$, with the value $\varphi(n_1)$ excluded, and checks that $\gcd(d_1', \varphi(n_1)) = 1$ i.e. the share must be invertible modulo $\varphi(n_1)$. If $\gcd(d_1', \varphi(n_1)) > 1$ then a new $d_1'$ is chosen at random. The second private exponent share $d_1''$ is then given by $$d_1'' = d_1 \cdot \frac{1}{d_1'} \mod \varphi(n_1).$$

At step 630, the client device's share of the first private key $\langle d_1', n_1 \rangle$ is stored in memory.

At step 635, the server's share of the first private key $\langle d_1'', n_1 \rangle$ is sent to the server over a secure channel. For example, this information may be conveyed to the server during manufacture.

At step 645, the client device deletes the values $p_1$, $q_1$, $d_1$, $d_1''$ and $\varphi(n_1)$ from memory and also deletes any other intermediate values generated during generation of the client device's share of the first private key.

Figure 7:
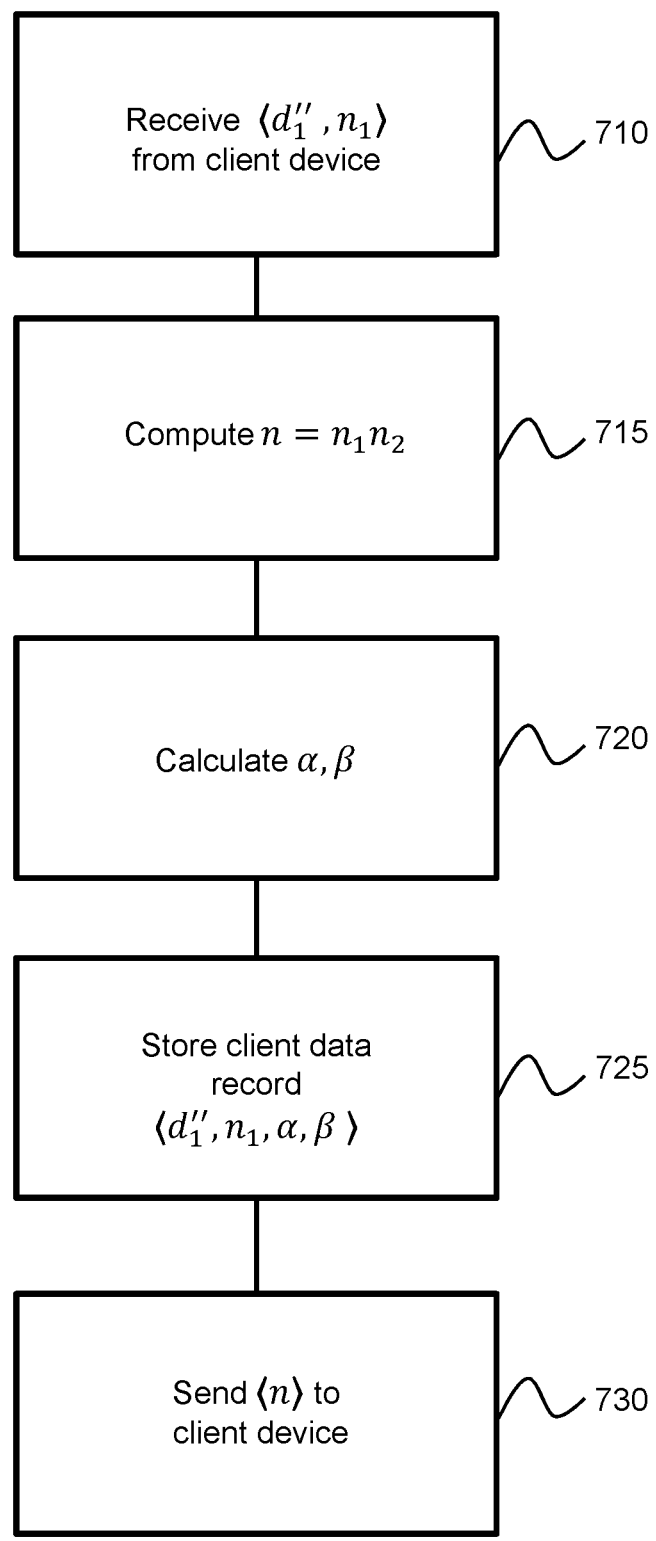
FIG. 7 is a flowchart for registering a first party or client device at a second party or server.

FIG. 7 is a flowchart of a method that may be performed at a server in order to register a client device.

At step 710, the server receives $\langle d_1'', n_1 \rangle$ from the client device. At step 715, the server computes $n = n_1 n_2$. At step 720, the server calculates the integers $\alpha$ and $\beta$ using the Extended Euclid's algorithm.

At step 725, the server stores the client device data $\langle d_1'', n_1, \alpha, \beta \rangle$ in the server's memory.

At step 730, the server sends the public exponent n to the client as acknowledgement that the client has successfully registered with the server.

Variations of the described arrangements are envisaged. For example, the features of all of the disclosed arrangements may be combined in any way.

In the examples provided above, the server has been described as sending the composite signature S to the client device. However, other scenarios are envisaged. For example, the server may send the composite signature to a digital repository for storage or may send the composite signature to a third party. For example, one may consider that a first party, or client, device may operate to send a message to a third party device, and that the third party will only accept the message if it has been verified by a second party, or server. Accordingly the first party and second party may generate a composite signature according to any method as described herein, and the trusted second party may communicate the composite signature to the third party. The third party may use a public key to verify the composite signature and thereby trust that the message from the first party has indeed been verified by the second party. The skilled person would envisage other scenarios in which such operation would be useful.

It is envisaged that in some circumstances no verification takes place at the server and/or the client device. For example, the server may simply process data received and issue a purported composite signature in accordance with a method as disclosed herein with no verification that the original received data originated at the client device.

The skilled person would understand that any asymmetric cryptosystem may be used. Any public and private key pair system in which the private key can be shared between parties can be used. For example, a cryptosystem based on elliptic curves or discrete logarithms may be used.

For convenience, in the descriptions provided above, a message m was sent across a communication channel. The communication channel may be any suitable communication channel such as a radio connection or the internet. The communication channel may involve a level of encryption.

For example, one or more transmissions such as that in which the message m and the first party y of the client signature is sent may be encrypted. For example, the message m and first party y may be encrypted using a public key of the server such that the message m and first party y are only retrievable by use of the server's private key. The message m may be a hashed and/or padded message. Any suitable hash function may be used, for example SHA-256. The message may be in any suitable format understood by a computing device.

The described methods may be implemented by a computer program. The computer program which may be in the form of a web application or 'app' comprises computer-executable instructions or code arranged to instruct or cause a computer or processor to perform one or more functions of the described methods. The computer program may be provided to an apparatus, such as a computer, on a computer readable medium or computer program product. The computer readable medium or computer program product may comprise non-transitory media such as a semiconductor or solid state memory, magnetic tape, a removable computer memory stick or diskette, a random access memory (RAM), a read-only memory (ROM), a rigid magnetic disc, and an optical disk, such as a CD-ROM, CD-R/W, DVD or Blu-ray. The computer readable medium or computer program product may comprise a transmission signal or medium for data transmission, for example for downloading the computer program over the Internet.

An apparatus or device such as a computer may be configured to perform one or more functions of the described methods. The apparatus or device may comprise a mobile phone, tablet, laptop or other processing device. The apparatus or device may take the form of a data processing system. The data processing system may be a distributed system. For example, the data processing system may be distributed across a network or through dedicated local connections.

The apparatus or device typically comprises at least one memory for storing the computer-executable instructions and at least one processor for performing the computer-executable instructions.

Annexe—Security Proofs

It is assumed that the RSA signature $\Sigma = P(\cdot)^d \mod n$ together with the padding scheme P is secure against existential forgeries via adaptive chosen message attacks. This means that the adversary $A^\Sigma$ has an oracle access to the signature scheme and has to produce a pair M, $\Sigma(H(M))$, such the H(M) was never queried from the oracle. Here, H is a hash function that is modelled as a random oracle.

As the client device's private exponent is shared between the client device and the server, in some proofs it has to be assumed that the adversary also has access to a partial signature oracle $\Sigma'(\cdot) = P(\cdot)^{d-r} \mod n$, where $r \leftarrow \{1, \ldots, (n)-1\}$ is a random number.

It is assumed that the output distribution of the padding is close to uniform on the image of P. It the padding scheme is probabilistic and uses a random salt s, then we assume that s is given as an argument to the oracle query is in the form $\Sigma(m,s) = P_s(m)^d \mod n$.

Adaptive Chosen Message Attack: The adversary $A^{\Sigma(\cdot)}$ having access to the signing oracle produces a correct message-signature pair M, $\Sigma(H(M))$, without querying $\Sigma$ with H(M).

Details of the security proof may depend on the types of primes used. Some types of primes may offer better attack-resistance, while other types of primes might be easier to generate.

A prime number p is called a safe prime if p=2p'+1, where p' is also prime. The corresponding prime p' is called a Sophie-Germain prime. The generation of safe primes is time-consuming, especially in low-power mobile devices. Hence, for this implementation, an alternative class of primes are used which are known as quasi-safe primes.

Definition 1. A prime number p is called an l-quasi-safe prime if p=2ap'+1, where p' is a prime and 1≤a<l.

The generation of quasi-safe primes is much faster compared to safe primes. For example, if one needs a 1024-bit p, then if one uses a 15-bit a (with $2^{14} \le a < 2^{16}$), one needs a 1008-bit p'.

Definition 2: A prime number p is called an (l,s)-safe prime if p=2a p'p''+1, where p' and p'' are primes, 1≤a<l, and min {p', p''}≥s.

Security Against Malicious Servers

A malicious server is considered as an adversary A, that has a sharer of the client device's private modulus d, which is uniformly distributed on $\mathbb{Z}_{\varphi(n)}$. The server-adversary A also has a connection to the client device that sends signing requests to the server. It is assumed that A is able to use such a connection as an oracle Σ i.e. to choose messages m, send m to the oracle and obtain $\Sigma'(m) = P(m)^{d-r} \mod n$. As A knows r, it is easy for A to compute $\Sigma(m) = \Sigma'(m) \cdot P(m)^r \mod n$.

The goal of $A^{\Sigma'}(r)$ is to produce a message M and the signature $\Sigma(H(M)) = P(H(M))^d \mod n$, such that H(M) was never queried from Σ'.

Theorem 1. If Σ is S-secure against existential forgeries via adaptive chosen message attack, then the shared signature system is $$\frac{s}{1+t_{mul}} - \text{secure against malicious servers,}$$

where $t_{mul}$ is the time needed for one modular multiplication (with the client's RSA modulus).

Proof (sketch) Let $A^{\Sigma'}(r)$ be a t-time adversary that with probability δ produces a pair M, Σ(H(M)) without calling Σ' with H(M). An adversary A' with running time t'≈t is constructed that has oracle access to Σ and with probability δ produces a pair M, Σ(H(M)), without calling Σ with H(M).

The adversary A' first picks a random number r' and then simulates $A^{\Sigma'}(r')$, so that the Σ'-calls Σ'(m) is answered with $\Sigma(m) \cdot P(m)^{-r'} \mod n$. As the simulation is perfect, the success probability of A' is δ.

The running time of A' is $t + l \cdot t_{mul}$. Thus, $$\delta \le \frac{t+t_{mul}}{s} \le t(1+t_{mul}), \text{ and } \frac{t}{\delta} \ge \frac{s}{1+t_{mul}}.$$

For example, if the ordinary RSA with 1024-bit primes is $2^{120}$-secure and an exponentiation takes time $(1024)^3 = 2^{30}$ (assuming that addition takes about 1024 steps), then the new signature system is at least $2^{90}$-secure against malicious servers.

Security Against Client Leakage Attack

It is assumed that the client device's share is encrypted with a block-cipher using PIN as the key. The cipher is modelled as an ideal cipher with two supporting oracles $E_k(x)$ and $E_k^{-1}(x)$. The adversary sees the encryption $c = E_{PIN}(d-r)$ and may try to decrypt it by using the oracle call $y = E_p^{-1}(c)$ with a guessed PIN p. If p=PIN then y=d-r, otherwise y is a random variable independent of d-r and r. Note that as the variables d-r, and y are identically distributed, there is no way for the adversary to see that p=PIN. This can only be checked via communicating with the server.

The adversary's access to the server is modelled as an oracle S with internal state. The oracle S receives queries of the form $(m, m^{d-r} \mod n)$ and returns $m^d \mod n$ if the query is in such form. Otherwise S returns ⊥. If it has returned ⊥ three times, then S "blocks" and will return only ⊥ even if the queries were correctly formed. Hence, if the adversary tries random p-s, computes $y = E_p^{-1}(c)$ and sends queries S with $(m, my^r \mod n)$, the success probability is $$\frac{3}{K},$$

where K is the total number of PINs.

Note that d−r mod φ(n) is uniformly distributed and independent of d. Also note that the adversary has no r, so if the S-oracle is not used during a forgery-attack, then decrypting d−r gives nothing to the adversary.

Lemma 1. If y and x are independent random variables and $x \leftarrow \mathbb{Z}_{\varphi(n)}$ is uniformly distributed, then $$Pr[m^y \equiv m^x (\mod n)] = \frac{1}{ord(m)},$$

where $m \in \mathbb{Z}_n^*$ and ord(m) is the order of m in the multiplicative group $\mathbb{Z}_n^*$.

Lemma 2. If n=pq and p, q are safe primes, then is $m \leftarrow \mathbb{Z}_n^*$ is a uniform random number then $$Pr\left[ord(m) < \min\left\{\frac{p-1}{2}, \frac{q-1}{2}\right\}\right] = \frac{16}{(p-1)(q-1)}.$$

Proof. By assumptions, there are prime numbers p' and q' such that p−1=2p' and q−1=2q'. Hence, the size of the group $\mathbb{Z}_n^*$ is φ(n)=(p−1)(q−1)=4p'q'. As the order of an element must be a divisor of the size of the group, any element m of $\mathbb{Z}_n^*$ has an order $ord(m) \in \{1,2,4\}$ or $ord(m) \ge \min\{p',q'\}$. As all the elements of orders 1, 2, 4 are roots of the polynominal $X^4-1$ in $\mathbb{Z}_n \cong \mathbb{Z}_p \times \mathbb{Z}_q$ and any polynominal of degree d may have no more than d roots in $\mathbb{Z}_p$ and $\mathbb{Z}_q$, the number of roots in $\mathbb{Z}_n$ cannot exceed $d^2$. Hence, the number of elements of degree less than min{p'q'} does not exceed $d^2 = 4^2 = 16$.

Lemma 3. If n=pq and p, q are l-quasi-safe primes, then if $m \leftarrow \mathbb{Z}_n^*$ is a uniform random number then $$Pr\left[ord(m) < \min\left\{\frac{p-1}{2\ell}, \frac{q-1}{2\ell}\right\}\right] = \frac{16 \ell^4}{(p-1)(q-1)}.$$

Proof. By assumptions, there are prime numbers p', q' such that p−1=2ap' and q−1=2a'q', where both a and a' belong to the interval [1 . . . l−1]. Hence, the size of the group $\mathbb{Z}_n^*$ is φ(n)=(p−1)(q−1)=4aa'p'q'. As the order of an element must be a divisor of the size of the group, any element m of $\mathbb{Z}_n^*$ has order ord(m) divisible by 4aa' or ord(m)≥min{',q'}. As all the elements of orders divisible by 4aa' are roots of the polynominal $X^{4aa'}-1$ in $\mathbb{Z}_n \cong \mathbb{Z}_p \times \mathbb{Z}_q$ and any polynominal of degree d may have no more than d roots in $\mathbb{Z}_p$ and $\mathbb{Z}_q$, the number of roots in $\mathbb{Z}_n$ cannot exceed $d^2$.

Hence, the number of elements of degree less than $$\min\{p', q'\} = \min\left\{\frac{p-1}{2a}, \frac{q-1}{2a'}\right\} \geq \min\left\{\frac{p-1}{2\ell}, \frac{q-1}{2\ell}\right\}$$

does not exceed $d^2=(4aa')^2 \leq 16l^4$.

Lemma 4. If n=pq and p, q, are (l, s)-quasi-strong primes, then if $m \leftarrow \mathbb{Z}_n^*$ is a uniform random number then $$Pr[ord(m) < s] = \frac{16\ell^4}{(p-1)(q-1)}.$$

Proof. By assumptions, there are prime numbers p', q' such that p−1=2ap'p" and q−1=2a'q'q", where both a and a' belong to the interval [1 . . . l−1]. Hence, the size of the group $\mathbb{Z}_n^*$ is φ(n)=(p−1)(q−1)=4aa'p'q'p"q". As the order of an element must be a divisor of the size of the group, any element m of $\mathbb{Z}_n^*$, has order ord(m) divisible by 4aa' or ord(m)≥min{P',q',p",q"}. As all the elements of orders divisible by 4aa' are roots of the polynominal $X^{4aa'}-1$ in $\mathbb{Z}_n \cong \mathbb{Z}_p \times \mathbb{Z}_q$ and any polynominal of degree d may have no more than d roots in $\mathbb{Z}_p$ and $\mathbb{Z}_q$, the number of roots in $\mathbb{Z}_n$ cannot exceed $d^2$ Hence, the number of elements of degree less than min{p', q',p",q"}≥s does not exceed $d^2=(4aa')^2 \leq 16l^4$.

Lemma 5. If n=pq and p,q are safe primes and P be a padding function, then if $m \leftarrow \mathbb{Z}_n^*$ is a uniform random number the $$Pr\left[ord(P(m)) < \min\left\{\frac{p-1}{2}, \frac{q-1}{2}\right\}\right] \leq \frac{16}{2^h} = 2^{-h+4},$$

where h is the hash length in bits.

Lemma 6. If n=pq and p,q are l-quasi-safe primes and P be a padding function, then if $m \leftarrow \mathbb{Z}_n^*$ is a uniform random number the $$Pr\left[ord(P(m)) < \min\left\{\frac{p-1}{2\ell}, \frac{q-1}{2\ell}\right\}\right] \leq \frac{16\ell^4}{2^h} = 2^{-h+4\log_2 \ell + 4},$$

where h is the hash length in bits.

Theorem 2. If Σ with safe primes is S-secure against adaptive chosen message attack, then no t-time adversary that has access to client's encrypted share $c=E_{PIN}(d-r)$ can create an existential forgery with probability greater than $$\frac{3}{K} + \frac{t}{S} + 2^{-h+4} + \frac{2K^2}{\min\{p, q\}-1}.$$

Proof. (sketch) Let $A^{\Sigma, S, E(\ ), E^{-1}(\ )}(c)$ be a t-time adversary that with probability δ produces a pair M, Σ(H(M)) without calling Σ with H(M). Run A in an environment in which all the oracle calls, except for Σ-calls are simulated. If A calls E( ) or $E^{-1}(\ )$, the standard "lazy sampling" is used.

A random PIN $p_i$ is picked from the set $\{p_1, \ldots, p_K\}$ of all possible PINs. This $p_0$ will be considered as the right PIN, and the "right" client's share is just a random number $d'' \leftarrow \mathbb{Z}_{\varphi(n)}$, i.e. we define $E_{p0}^{-1}(c)=d''$ and $E_{p0}(d'')=c$ and add these values to the lazy-sampling database.

An S-call S(m,s,y) will be simulated as follows. For the correctness check, we compare y with $P_s(m)^{d''}$ mod n and if there is no match, return ⊥, otherwise, make a Σ-call σ=Σ(m,s) and return σ. Note that there is no need for r (the server's share of the client's secret exponent).

The probability $\delta_a$ that A is successful (produces a forged signature on M) while never calling S successfully with input H(M) cannot exceed $$\frac{t'}{S},$$

where t' is the running time of the simulation experiment. As there is no expensive overhead, it can be assumed that t'≈t.

The probability $\delta_b$ that A makes a successful S-call S(H(M),s,y) is by Lemma 5, not much larger than $$\frac{3}{K}.$$

This is because, as H(M) is a uniformly random number, the probability that $$ord(P(H(M))) \geq \left\{\frac{p-1}{2}, \frac{q-1}{2}\right\}$$

is at least $1-2^{-h+4}$. If this is the case, the probability that all the values $(P(H(M)) E_{pi}^{-1}(c)$ mod n (for i=1 . . . K) are distinct is about $$1 - \frac{2K^2}{\min\{p, q\}-1}$$

and any oracle call is successful with probability not larger than $$\frac{1}{K}.$$

Hence $$\delta_b \leq \frac{3}{K} + 2^{-h+4} + \frac{2K^2}{\min\{p, q\}-1}$$

which means that $$\delta \leq \delta_a + \delta_b \leq \frac{3}{K} + \frac{t}{S} + 2^{-h+4} + \frac{2K^2}{\min\{p, q\}-1}.$$

Theorem 3. If Σ with l-quasi-safe primes is S-secure against adaptive chosen message attack, then no t-time adversary that has access to the client's encrypted share $c = E_{PIN}(d-r)$ can create an existential forgery with probability greater than $$\frac{3}{K} + \frac{t}{S} + 2^{-h+4\log_2 \ell + 4} + \frac{2\ell K^2}{\min\{p, q\} - 1}.$$

Proof. Completely analogous to the proof of Theorem 2, except that Lemma 6 is used instead of Lemma 5.

For example, if one uses 1024-bit primes, $l=2^{16}$, the ordinary TSA is $2^{90}$-secure and we use a 256-bit hash function is used then for a t-time adversary the guessing probability is:

$$\frac{3}{K} + 2^{-90+t} + 2^{-188} + 2^{-1019+2\log_2 K}$$

By at least the proof presented in this annex, the security of the methods proposed herein are demonstrated.

The invention claimed is:

1. A method for generating a composite cryptographic signature, the method comprising:
    receiving, at a computer server from a client device over a communication network, a signing request including a message and a first part of a first party signature, the first part of the first party signature derived from the message and a first share of a first private key;
    generating, at the computer server, the first party signature from the first part of the first party signature and a second share of the first private key;
    generating, at the computer server, a second party signature from the message and a second private key;
    verifying, at the computer server, that the first part of the first party signature was generated using the first share of a first private key;
    combining, at the computer server, the first party signature and the second party signature to generate a composite cryptographic signature and sending the composite cryptographic signature to the client device;
    the client device verifying that the composite cryptographic signature has indeed been created using the second private key and only accepting that a response is from the computer server and not an adversary when the composite cryptographic signature has indeed been created using the second private key.

2. The method according to claim 1, wherein the first private key and a public key are a first key pair, and wherein the second private key and the public key form a second key pair.

3. The method according to claim 2, wherein the first private key comprises a first private modulus and a first private exponent; and wherein the second private key comprises a second private modulus and a second private exponent; and wherein the public key comprises a public exponent.

4. The method according to claim 3, wherein the first private modulus is a product of prime numbers; and the second private modulus is a product of prime numbers; and wherein each of the prime numbers is coprime to the public exponent.

5. The method according to claim 3, further comprising generating a composite public modulus from the first private modulus and the second private modulus.

6. The method according to claim 3, wherein the first share of the first private key comprises a first additive share of the first private exponent; and wherein the second share of the first private key comprises a second additive share of the first private exponent.

7. The method according to claim 3, wherein the first share of the first private key comprises a first multiplicative share of the first private exponent; and wherein the second share of the first private key comprises a second multiplicative share of the first private exponent.

8. The method according to claim 2, further comprising: verifying the origin of the first part of the first party signature using the public key and the message.

9. The method according to claim 8, wherein verifying the origin of the first part of the first party signature comprises checking that the signing request further comprises information relating to one or more previous communications from the same origin.

10. The method according to claim 1, wherein receiving a message and a first part of a first party signature comprises receiving a message and a first part of a first party signature over a secure channel.

11. The method according to claim 1, wherein the message is a hashed message.

12. The method according to claim 1, wherein the message is a padded message.

13. An apparatus comprising at least one processor and at least one memory, wherein the at least one memory stores computer-executable instructions which, when executed by the at least one processor, cause the apparatus to:
    receive from a client device over a communication network, a signing request including a message and a first part of a first party signature, the first part of the first party signature derived from the message and a first share of a first private key;
    generate a first party signature from the first part of the first party signature and a second share of the first private key;
    generate a second party signature from the message and a second private key;
    verify that the first part of the first party signature was generated using the first share of a first private key;
    combine the first party signature and the second party signature to generate a composite cryptographic signature and send the composite cryptographic signature to the client device;
    the client device verifying that the composite cryptographic signature has indeed been created using the second private key and only accepting that a response is from the apparatus and not an adversary when the composite cryptographic signature has indeed been created using the second private key.

14. A non-transitory computer readable medium having computer-executable instructions to cause a computer to perform a method according to claim 1.

15. A method for generating a composite cryptographic signature, the method comprising:
    at a first device:
    generating a first part of a first party signature from a message and a first share of a first private key; and
    sending the message and the first part of the first party signature to a second device;
    at the second device:
    generating a first party signature from the first part of the first party signature and a second share of the first private key;
    generating a second party signature from the message and a second private key;

verifying that the first part of the first party signature was generated using the first share of the first private key;

combining the first party signature and the second party signature to form a composite cryptographic signature and sending the composite cryptographic signature to the first device;

the first device verifying that the composite cryptographic signature has indeed been created using the second private key and only accepting that a response is from the second device and not an adversary when the composite cryptographic signature has indeed been created using the second private key.

16. The method according to claim 15, further comprising:

at the second device, communicating a composite public key to the first device; and at the first device, verifying the composite cryptographic signature using the message and the composite public key.

17. A system for generating a composite cryptographic signature, the system comprising a first device and a second device, wherein the first device and the second device each comprise a processor and at least one memory, and wherein the at least one memory of the first device and the at least one memory of the second device each store computer-executable instructions which, when executed by the processors of the first device and the second device respectively, cause the first device and the second device to perform a method according to claim 15.

* * * * *